(12) United States Patent
Govindaraju et al.

(10) Patent No.: US 7,758,238 B2
(45) Date of Patent: Jul. 20, 2010

(54) TEMPERATURE MEASUREMENT WITH REDUCED EXTRANEOUS INFRARED IN A PROCESSING CHAMBER

(75) Inventors: Sridhar Govindaraju, Hillsboro, OR (US); Karson Knutson, Beaverton, OR (US); Harold Kennel, Portland, OR (US); Aravind Killampalli, Hillsboro, OR (US); Jack Hwang, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 2 days.

(21) Appl. No.: 12/217,063

(22) Filed: Jun. 30, 2008

(65) Prior Publication Data

US 2009/0323759 A1   Dec. 31, 2009

(51) Int. Cl.
*G01K 5/00* (2006.01)
*G01K 13/00* (2006.01)
*G01J 5/00* (2006.01)

(52) U.S. Cl. .............. 374/123; 374/121; 374/130; 374/141

(58) Field of Classification Search .............. 374/121, 374/130, 141, 123
See application file for complete search history.

(56) References Cited

U.S. PATENT DOCUMENTS

| | | | | |
|---|---|---|---|---|
| 5,271,084 | A * | 12/1993 | Vandenabeele et al. | 392/416 |
| 5,743,643 | A * | 4/1998 | Gronet et al. | 374/121 |
| 5,940,158 | A * | 8/1999 | Kawabata | 349/179 |
| 6,160,242 | A * | 12/2000 | Guardado | 219/390 |
| 6,200,634 | B1 * | 3/2001 | Johnsgard et al. | 427/248.1 |
| 2005/0023267 | A1 * | 2/2005 | Timans et al. | 219/405 |
| 2008/0002753 | A1 * | 1/2008 | Timans | 374/2 |

* cited by examiner

*Primary Examiner*—Gail Verbitsky
*Assistant Examiner*—Mirellys Jagan
(74) *Attorney, Agent, or Firm*—Blakely, Sokoloff, Taylor & Zafman LLP

(57) ABSTRACT

Temperature measurement using a pyrometer in a processing chamber is described. The extraneous light received by the pyrometer is reduced. In one example, a photodetector is used to measure the intensity of light within the processing chamber at a defined wavelength. A temperature circuit is used to convert the measured light intensity to a temperature signal, and a doped optical window between a heat source and a workpiece inside processing chamber is used to absorb light at the defined wavelength directed at the workpiece from the heat source.

15 Claims, 3 Drawing Sheets

TEMPERATURE MEASUREMENT WITH REDUCED EXTRANEOUS INFRARED IN A PROCESSING CHAMBER

BACKGROUND

1. Field

The present invention relates to the field of thermal processing for semiconductor and micromachined substrates, and, in particular, to determining the temperature of a processing chamber by measuring light intensity 2. Related Art Rapid thermal annealing (RTA) is commonly performed using lamps. The workpiece, for example, a silicon wafer, a micro-machine or other device is exposed to the heat lamps for a short period of time to heat it. The workpiece is then pulled away or the lamps are turned off to allow the workpiece to cool. The temperature, timing and any repetitions for an annealing process are carefully measured and controlled so that the intended effect can be obtained reliably and repeatedly.

Since the lamps primarily operate by exposing the workpiece to infrared light, photodetectors are often used to measure the light output and the temperatures. Photodetectors have the advantage of being quick and accurate as compared to thermocouples and other types of temperature sensors. For many processes, photodetectors are used in combination with thermocouples and other temperature sensors to control the lamps, the timing, and other aspects of the annealing process.

For some workpieces, such as a silicon wafer, the infrared light from the heat lamps is absorbed by the silicon and other components in the wafer. As the wafer heats up, it begins to radiate light that is characteristic of it's own temperature, which is separate from the temperature of the lamps or the chamber in which the workpiece is being heated.

In many RTA tools, the temperature sensor inside the tool is pointed at the workpiece in order to measure the infrared light radiated by the workpiece. One common temperature sensor used in RTA tools is a pyrometer. The primary detector in the pyrometer is a photodiode which receives light radiated by the workpiece. The intensity of this light is then converted into a temperature measurement. A primary difficulty in accurately measuring the temperature of the workpiece is the influence of infrared light from other sources that are present in the chamber. These other sources include light radiating off the walls of the processing chamber inside the tool as well as light that comes directly, or via reflections, from the lamps.

A variety of approaches have been used to limit the effect of these other light sources. One common approach is a long light tube such as an optic fiber which is placed close to the workpiece to prevent other sources of light from entering the optic fiber. Another approach is to place the heat source on one side of the workpiece and the pyrometer on the opposite side of the workpiece. A further approach is to cycle the heat lamps on and off and only measure the temperature while the heat lamps are off. More complex methods make comparisons of the intensity when the heat lamps are on versus when the heat source is off. Another approach is to carefully choose the heat source so that it only produces light that is not detected by the photo detector. An alternative approach is to alter the light source so that certain wavelengths are absent in the spectral output of lamps.

RTA has become popular for a wide range of different processes. These processes can be applied to silicon substrates, gallium arsenide substrates, photocell manufacture, micromachines, and a wide range of other processes. RTA is used for contact alloying, ion implantation, silicide formation, nitridation of metals, oxidation processes, reflowing glass structures, oxidation at high temperatures, high and low k annealing, and annealing of copper and other metal structures. RTA is also used with chemical vapor deposition (CVD).

In many of these processes, the workpiece such as a silicon substrate or solar panel is exposed to temperatures above 200° C., which may be anywhere from 200° C. to 1500° C. for a short amount of time such as a few minutes or a few seconds. The workpiece is then brought back to ambient temperature and the process is repeated. Because the workpiece is exposed to the high temperature for only a short amount of time and because the amount of thermal exposure is important to the process, the temperature within an RTA tool is controlled very precisely.

BRIEF DESCRIPTION OF THE DRAWINGS

Embodiments of the present invention may be understood more fully from the detailed description given below and from the accompanying drawings of various embodiments of the invention. The drawings, however, should not be taken to be limiting, but are for explanation and understanding only.

DETAILED DESCRIPTION

According to embodiments of the present invention, no geometrical constraints are placed on the design of a processing chamber in an RTA tool. The heat source in some embodiments of the invention does not require any particular design for tuning the spectrum of light that is output by it and yet a pyrometer is able to measure only heat emitted by the workpiece or generated in the chamber independent of the heat source.

In one embodiment, a suitable optical component, for example a doped glass window, is placed between a light source (for example flash lamps), that are used to heat the processing chamber of an RTA tool. The optical component, such as a doped glass window, will absorb one or more specific wavelengths from the total spectrum of light output by this light source. The workpiece, such as a silicon wafer or any other substrate, absorbs heat from the remainder of the wavelengths from the light source and re-emits light in several different specific wavelengths as the workpiece heats up. The pyrometer is selected so that the light from the workpiece includes a wavelength to which the pyrometer is sensitive. The particular wavelengths that are absorbed and re-emitted by the workpiece depend on the construction material and mechanical configuration of the workpiece.

By designing the doped window to absorb a wavelength that the workpiece emits and the pyrometer detects, the pyrometer is made to measure only light that is emitted from the workpiece. The pyrometer measurement, in other words, indicates the amount of heat that is being emitted by the workpiece. This provides a more accurate measure of the temperature of the workpiece. Optical elements can be tuned to collect and analyze the light emitted by the workpiece at this particular wavelength to provide critical insight into the temperature of the workpiece.

In this description, the term wavelength is used to refer to a range of wavelengths centered around a particular one wavelength. For the emission spectrum of a particular workpiece as described herein, most of the wavelengths are centered around a particular wavelength that is measured in nanometers (nm) and the range of wavelengths falls within a fraction of a nanometer of the central wavelength. However, for some wavelengths, the range of wavelengths may be much wider. While embodiments of the invention are described specifically in the context of a single wavelength of 980 nm, more wavelengths and different wavelengths may be used. Accordingly, whenever a single wavelength is mentioned, one or more other wavelengths may be used as well as a range of wavelengths, depending on the particular implementation.

Figure 1:
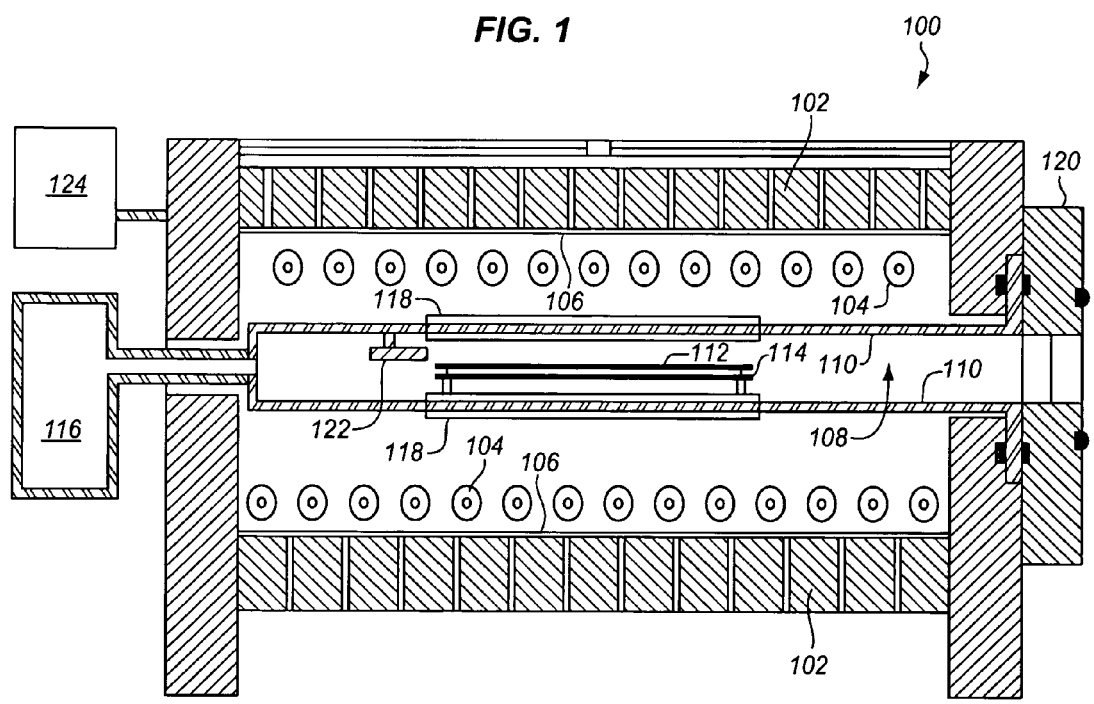
FIG. 1 is a diagram of a thermal tool according to an embodiment of the present invention.

FIG. 1 shows an example of an RTA tool 100. The RTA tool is surrounded by a series of cooling channels 102. In this particular example, the tool is a cold wall system, however, embodiments of the present invention may also be used for warm wall and hot wall systems. In this cold wall system, the cooling channels carry water and may be made from materials such as stainless steel, aluminum, or other alloys in appropriate shapes to cool the walls of the tool. Cooling the walls of the RTA tool reduces the thermal memory of the tool so that when the thermal lamps are turned off, the workpiece can cool more effectively. The cool walls also help in measuring the temperature of the workpiece 112 inside the chamber 108. The RTA tool includes a set of heat lamps 104 which apply heat to the workpiece. In the illustrated example, the heat lamps produce infrared light that travels into the processing chamber 108 to heat the silicon wafer inside.

Tungsten halogen tube lamps can be provided in an array. In the example of FIG. 1, tube lamps are arranged in a single row both above and below the processing chamber. Alternatively, the lamps can be provided in a special housing that can provide multiple arrays that may be arranged in different directions. For example, an upper row of lamps may be provided in a transverse direction while a lower array of lamps may be provided in a longitudinal direction. The present invention may be applied to any type or array of heat sources including heat lamps and other sources.

A tungsten halogen lamp typically produces light in the range of 300 nm to 4000 nm. Alternatively, in some RTA tools, high energy arc lamps are used which produce light in the range of 200 nm to 1400 nm. The lamp array is specifically designed for even, uniform, illumination across the wafer and a variety of different designs are used. Above the top array of lamps and below the bottom array of lamps are reflectors 106. In the example of FIG. 1, the reflectors are shown as a single flat sheet, however, any particular reflector design may be adapted to suit the type of lamp and the orientation of the lamps.

The processing chamber 108 is between the two rows of lamps, that is, it is below the upper array of lamps and above the lower array of lamps and in each case it is opposite the reflector. In this way, the heat from the heat lamps is directed primarily toward the processing chamber. The processing chamber has walls 110. These walls may be made of quartz, sapphire or any other high temperature material. Both the upper and lower walls have a window 118 which allows the infrared light produced by the heat lamps to come through the processing chamber walls 110 and impinge upon the workpiece 112. The window can be made of quartz, phosphate, sapphire, or any other suitable material that can withstand the temperature cycling within the RTA tool.

The processing chamber 108 further includes a workpiece carrier 114 which allows the workpiece 112 to be held in place and removed from and inserted into the processing chamber. Access to the processing chamber is provided by an access door 120. In addition, a gas handling system 116 allows a variety of processing and purged gases to be pumped into and out of the processing chamber 108. So, for example in a chemical vapor deposition process, the deposition material may be pumped into the chamber by the gas handling system and at the end of this process the chamber may be purged with a purge gas such as nitrogen. For oxidation and nitridation processes, controlled amounts of nitrogen, oxygen, and other gases may be pumped into and out of the chamber as required.

The RTA tool 100 further includes a pyrometer 122 which is, in this example, directed toward the wafer. The pyrometer is also coupled to a thermal control system 124 which receives thermal measurements from the pyrometer and controls the lamps accordingly. The lamps may be controlled in groups or as a single unit depending on the particular design of the heat lamps and reflectors. The pyrometer is constructed using a photodiode contained in a stable housing and provided with protective and optical elements between the photodiode and the processing chamber's internal environment.

In use, a workpiece is placed into the processing chamber of the RTA tool through the door. The gas handling system then fills the processing chamber with the desired gas depending on the particular process being used. The heat lamps are then activated and the temperature within the processing chamber is cycled according to the particular recipe desired. For thermal annealing, the temperature is typically raised to some temperature, typically above 300° C. In some processes, a temperature of approximately 800° C. to 1000° C. is used. The temperature is then dropped. Typically, it is dropped down to ambient or less. Alternatively the temperature may be reduced in steps or stages. It may also be increased in steps or stages. The thermal cycling is repeated a certain number of times with timing that depends on the particular material that is to be annealed and the desired end results. When the process has concluded, the gas handling system purges the chamber. The door is opened and the workpiece carrier is withdrawn from the processing chamber. The workpiece can then be removed from its carrier and a new process can be performed inside the processing chamber.

As described in more detail below, the windows in the processing chamber 118 through which the light from the heat lamps propagates to each workpiece 112 are doped with a suitable material. The doped windows absorb light at one or more wavelengths or one or more ranges of wavelengths. The particular wavelengths depend upon the window material and the dopant material. The wavelengths are specifically selected to be well within the range of the heat lamps and also within the range of the pyrometer 122. The effect of this dopant is shown more clearly in FIG. 2.

Figure 2:
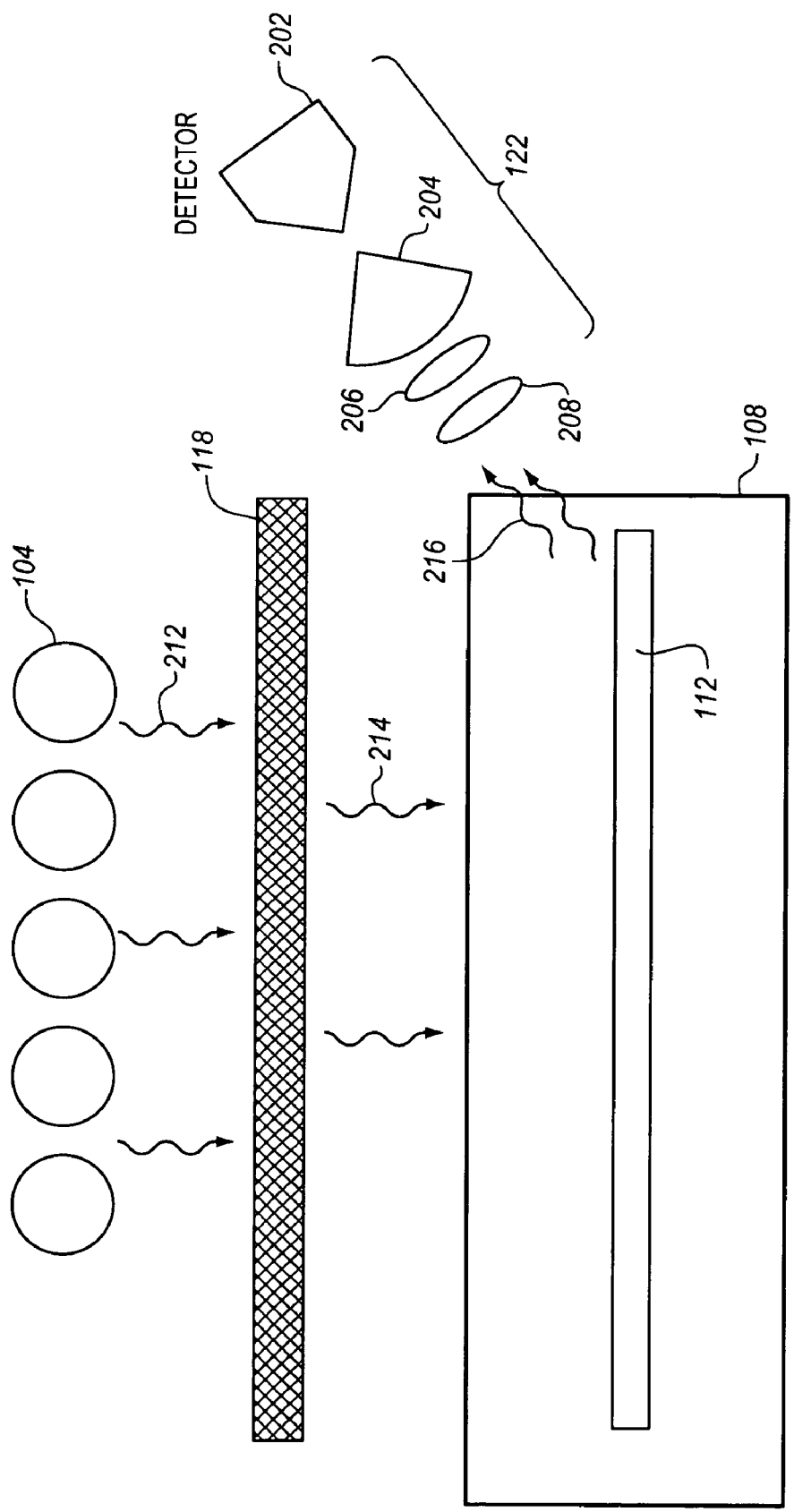
FIG. 2 is a diagram of light generation, filtering, and measurement as might be performed by the tool of FIG. 1 according to an embodiment of the present invention.

FIG. 2 shows the heat lamps 104 on one side of the processing chamber 108. Any other heat lamp arrangement may be used. However, a simple row of tubes is shown in order to simplify the drawing. The radiation 212 from the heat lamps 104 passes through the doped window 118. The remaining radiation after the absorption by the doped window is shown as radiation 214. This radiation impinges upon the wafer 112.

In the diagram of FIG. 2, the doped window is shown as being outside of the processing chamber. This corresponds to an alternative embodiment. The doped window may be a window that is incorporated into or cut into the wall of the processing chamber as shown in FIG. 1. Alternatively, the doped window may be placed outside of the processing chamber without making any modifications to the process chamber itself. The external doped window then prevents light within the defined wavelength or wavelengths from reaching a conventional window in the processing chamber wall 110.

In the example of FIG. 2, the radiation 214 that comes through the doped window is absorbed by the workpiece 112. This heat is then re-emitted depending upon the emission spectrum of the wafer. The re-emitted light 216 is then, in part, detected by the pyrometer 122. The pyrometer in the example of FIG. 2 is shown as being directed at the wafer so as to primarily collect light which is emitted by the wafer. While only one pyrometer is shown in both FIGS. 1 and 2, more pyrometers may be used in different locations to obtain more accurate, more specific, or additional readings. In addition, different pyrometers may be oriented in different directions in order to detect the temperature of different areas or different surfaces in the processing chamber.

In the example of FIG. 1, the pyrometer is shown as being inside the processing chamber. This allows for a very direct measurement which may be more accurate. In FIG. 2, the pyrometer is shown as being outside the processing chamber. This allows the pyrometer to be protected from the high temperatures inside the chamber. In other designs, a heat resistant light pipe inside the chamber conducts light to a photodetector outside the chamber.

A variety of temperature controlled systems can be used for pyrometer calibration, averaging, and specific temperature measurement. In addition, the present invention may be used with a variety of temperature calibration measurement systems. Pyrometers may also be combined with thermocouples such as chrome alumel or platinum palladium thermocouples.

In the example of FIG. 2, a pyrometer has a detector 202 which may be made of a photodiode, or other suitable component. Collecting optics 204 are placed before the photo detector to collect and focus the light from the workpiece 112 onto the sensitive portion of the photo detector 202. In addition, a band-pass filter 206 may be used before the photodiode. In this embodiment, the band-pass filter is specifically designed to allow light that is within the defined wavelength or wavelengths to pass through and to absorb or reflect light that is outside this defined wavelength or wavelengths. These optics may be used with or without a light pipe.

The band-pass filter acts together with the doped window 118 so that the same or about the same wave band is affected by both components. In other words, light from the lamps that is within this defined wavelength or wavelengths is kept out of the chamber by the doped window. This same wavelength or wavelengths of light is the only light that reaches the pyrometer. Accordingly, the light detected by the pyrometer does not come from the lamps but from the workpiece.

In a real system, light within this defined wavelength may also be emitted by other materials in the chamber and neither the doped window nor the band-pass filter may be perfect so that some light within the defined wavelength passes through the doped window and some light outside the defined wavelength or wavelengths passes through the band-pass filter. This can be avoided, in part, by configuring the doped window to block a larger band of light wavelengths than is allowed by the band-pass filter, however, the particular wavelength to be allowed or restricted will depend on the particular implementation and the materials that are used.

In addition, a long-pass filter 208 may be used between the workpiece 112 and the photo detector 202. The long-pass filter aids the band-pass filter by allowing light longer than a specified wavelength to pass through. Light with a shorter wavelength is reflected. As an alternative to a long-pass filter and a band-pass filter, a long-pass filter and a short-pass filter may be used to constrain the transmission of light to the defined wavelength or wavelengths that is blocked or absorbed by the doped window. Alternatively, a short-pass filter and a band-pass filter may be used or a variety of other filters depending on the particular wavelengths which are to be affected.

The doped window may be made of a variety of materials and coated with different materials depending upon the desired wavelength to be affected. Suitable materials for the window include glass, quartz, phosphate, and sapphire. In one example, the fluorescent absorption of rare earth elements may be used on a glass or quartz window. For a tool that operates in a range of 300° C. to 1200° C. and uses tungsten halogen lamps as the light source, the optical doped window between the lamps and the workpiece may be produced by doping a quartz plate with erbium and ytterbium. An erbium ytterbium doping may be used to absorb light centered around 980 nm. This wavelength also provides excellent temperature sensitivity with the 300° C. to 1000° C. range typically used for semi conductor manufacturing. In other words, the intensity of light emitted by a silicon wafer at the 980 nm wavelength is closely related to the temperature of the wafer.

In one embodiment, the window is made from a trivalent erbium-ytterbium-codoped phosphate glass. This glass can be produced by doping a phosphate glass with $Er_2O_3$ and $Yb_2O_3$, yielding free $Er^{3+}$ and $Yb^{3+}$ ions in the resulting material. In such a material, the $Yb^{3+}$ ions absorb strongly at 980 nm and then transfer the energy to $Er^{3+}$ ions. Within the important ranges for a heating chamber, for example 350 nm to 1600 nm, other wavelengths are also absorbed but at much lower levels. A concentration of about $1.6 \times 10^{20}$ $Er/cm^3$ is effective for absorbing almost all of the 980 nm light produced in a typical rapid thermal annealing chamber. As an alternative, other erbium-ytterbium alkali-metal borate or fluorohafnate glasses may be used. Other dopant and dopant combinations may also be used.

The thermal impact on the quartz plate of absorbing light within this narrow band is small compared to the heat from light absorbed by the quartz plate generally and can easily be accommodated by the tool's cooling system. 980 nm is within the sensitive ranges of photo diodes that are commonly used as pyrometers and provides good signal-to-noise ratio for estimating the temperature accurately. The doped window may alternatively be made by doping a quartz plate with other rare earth elements or with any other suitable optical doping.

A wide range of different wavelengths and filtering materials may be used depending on the particular application for the processing chamber. In the described examples, the band-pass filter on the pyrometer is adjusted to pass just that wavelength or wavelengths that is absorbed or reflected by the workpiece in the processing chamber. Both of these optical filters can be altered to pick an appropriate wavelength.

Figure 3:
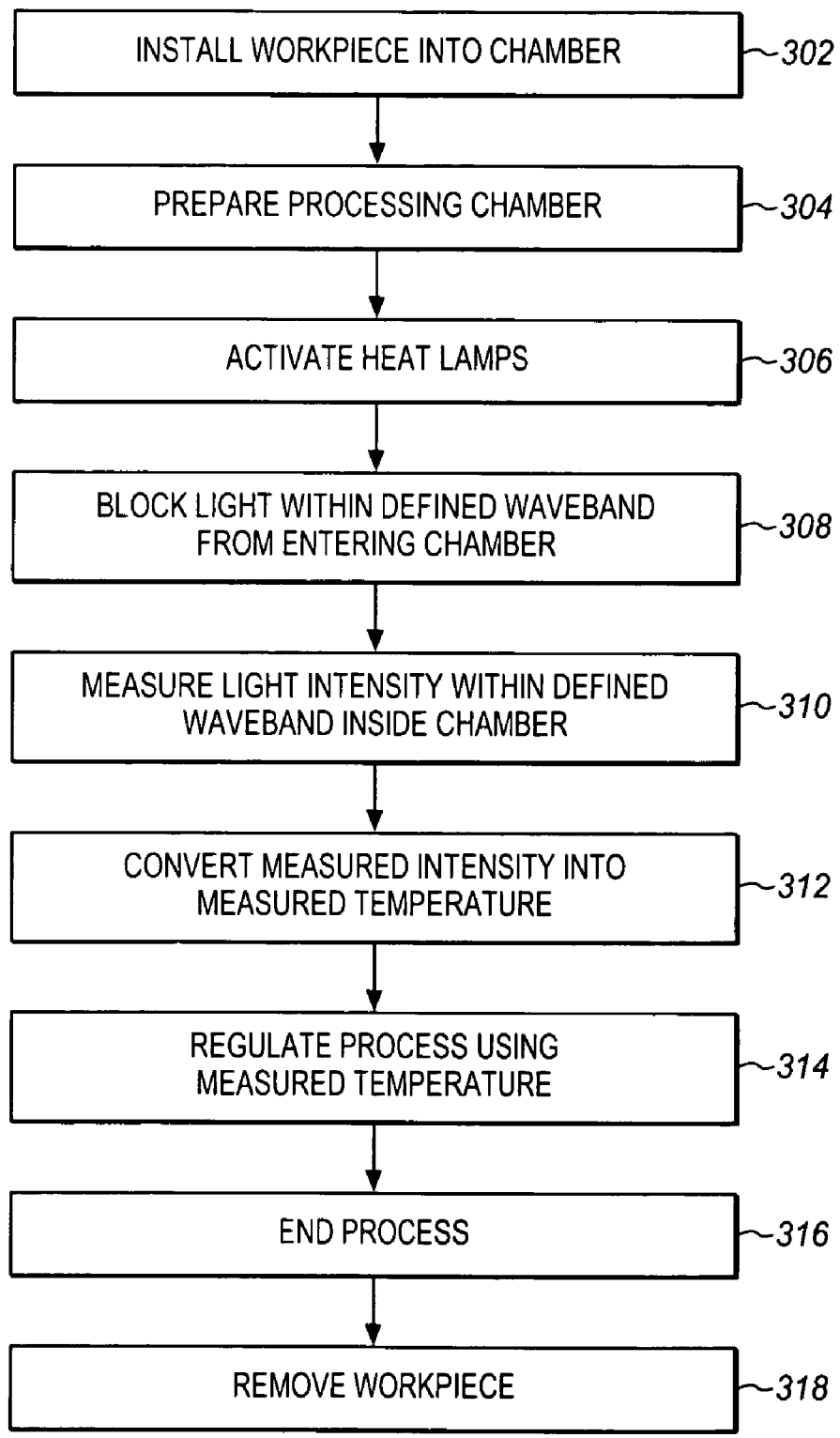
FIG. 3 is a process flow diagram of the operation of the tool of FIG. 1 according to an embodiment of the invention.

FIG. 3 presents an example of the use and operation of a system in accordance with an embodiment of the present invention. According to FIG. 3, a workpiece is first installed into a chamber at block 302. The chamber, such as the processing chamber 108 shown in FIGS. 1 and 2 is then prepared for some sort of fabrication, annealing, or similar operation at block 304. This preparation typically involves controlling the environment, applying deposition gases, creating a vacuum, and similar types of operations. At block 306 the heat lamps are activated in order to heat the workpiece inside the chamber.

At block 308, light within a defined wavelength such as a wavelength around 980 nm is blocked from entering the chamber. At block 310, the light intensity within the defined wavelength is measured inside the chamber. This may be performed by a pyrometer 122 or by several pyrometers. At block 312, this measured light intensity is converted into a temperature reading. At block 314, this temperature reading is used to regulate the process that is being performed inside the chamber. At block 316, the process ends. The chamber can then be brought to ambient conditions or purged depending on the particular process and at block 318 the workpiece is removed.

The example tool, chamber construction, and processes described above are provided only as examples. There may be other and different physical designs and process flows to which the present invention may be applied. The examples above show how controlling the light into a processing chamber can be used to obtain more accurate measurements of temperatures within the chamber. The particular wavelengths and filtering arrangements may be selected with the above examples in mind and the particular processes that are to be performed within the chamber.

A lesser or more complex tool, chamber, heat lamp, doping window and pyrometer may be used than those shown and described herein. Therefore, the configurations may vary from implementation to implementation depending upon numerous factors, such as price constraints, performance requirements, technological improvements, or other circumstances. Embodiments of the invention may also be applied to other types of processing chambers that use different materials and different workpieces than those shown and described herein. While the description above refers primarily to 980 nm doped window and photodetection techniques, the invention is not so limited and may be applied to a wide range of other wavelengths that can be affected by doped windows and other process parameters. In addition, the invention may be applied to the production of semiconductors, microelectronics, micromachines and other devices that use photolithography technology.

In the description above, numerous specific details are set forth. However, it is understood that embodiments of the invention may be practiced without these specific details. For example, well-known equivalent materials may be substituted in place of those described herein, and similarly, well-known equivalent techniques may be substituted in place of the particular processing techniques disclosed. In addition, steps and operations may be removed or added to the operations described to improve results or add additional functions. In other instances, well-known circuits, structures and techniques have not been shown in detail to avoid obscuring the understanding of this description.

While the embodiments of the invention have been described in terms of several examples, those skilled in the art may recognize that the invention is not limited to the embodiments described, but may be practiced with modification and alteration within the spirit and scope of the appended claims. The description is thus to be regarded as illustrative instead of limiting.

What is claimed is:

1. A thermal processing tool comprising:
    a processing chamber to contain a processing gas and a workpiece;
    a heat source to heat the workpiece using infrared light;
    a photodetector to measure the intensity of light within the processing chamber at a defined wavelength;
    a temperature circuit to convert the measured light intensity to a temperature signal;
    a doped optical window between the heat source and the workpiece to absorb light at the defined wavelength directed at the workpiece from the heat source; and
    an optical filter between the photodetector and the workpiece to reduce light received by the photodetector that is not within the defined wavelength.

2. The tool of claim 1, wherein the optical filter is a narrow band-pass optical filter.

3. The tool of claim 1, wherein the photodetector is directed at the workpiece to measure the intensity of light emitted from the workpiece.

4. The tool of claim 1, wherein the workpiece is a silicon wafer and the processing chamber is adapted to perform a rapid thermal anneal.

5. The tool of claim 1, further comprising a gas handling system to supply and maintain the process gas within the processing chamber and a pure gas to flush the processing chamber.

6. The tool of claim 1, wherein the optical filter comprises a long pass filter.

7. The tool of claim 6, wherein the optical filter comprises a short pass filter.

8. The tool of claim 1, wherein the defined waveband is within the range of infrared light produced by the heat source.

9. The tool of claim 8, wherein the workpiece emits light within the defined waveband when heated.

10. The tool of claim 1, wherein the doped optical window is a doped quartz window to absorb light within the defined wavelength.

11. The tool of claim 10, wherein the heat source is outside the processing chamber.

12. The tool of claim 11, wherein the heat source is an infrared light source, and wherein the window is a part of the processing chamber to allow the infrared light from the heat source to enter the processing chamber to heat the workpiece.

13. The tool of claim 1, wherein the doped optical window is doped by adding an impurity element of small concentrations to a substrate material of the window.

14. The tool of claim 13, wherein the substrate material comprises a quartz-based material.

15. The tool of claim 13, wherein the dopant of the window comprises of erbium and ytterbium targeted for operation around 980 nm.

* * * * *

UNITED STATES PATENT AND TRADEMARK OFFICE
CERTIFICATE OF CORRECTION

| | | |
|---|---|---|
| PATENT NO. | : 7,758,238 B2 | |
| APPLICATION NO. | : 12/217063 | |
| DATED | : July 20, 2010 | |
| INVENTOR(S) | : Govindaraju et al. | |

It is certified that error appears in the above-identified patent and that said Letters Patent is hereby corrected as shown below:

In column 8, at line 17 delete, "hand-pass" and insert --band-pass--.

In column 8, at line 26 delete, "pure" and insert --purge--.

Signed and Sealed this
Fourth Day of January, 2011

David J. Kappos
*Director of the United States Patent and Trademark Office*